United States Patent [19]

Yamashita et al.

[11] Patent Number: 5,449,973

[45] Date of Patent: Sep. 12, 1995

[54] LIGHTING CIRCUIT FOR VEHICULAR DISCHARGE LAMP

[75] Inventors: Masayasu Yamashita; Goichi Oda; Masaru Sasaki, all of Shimizu, Japan

[73] Assignee: Koito Manufacturing Co., Ltd., Tokyo, Japan

[21] Appl. No.: 79,947

[22] Filed: Jun. 23, 1993

[30] Foreign Application Priority Data

Jun. 23, 1992 [JP] Japan ................................. 4-187446

[51] Int. Cl.⁶ ............................................. H05B 37/02
[52] U.S. Cl. ...................................... 315/82; 315/308; 340/636; 307/10.8
[58] Field of Search ............ 315/82, 307, 200 R, 315/247, 209 R, 224, 291, 227 R, 308; 340/641, 636; 307/10.8

[56] References Cited

U.S. PATENT DOCUMENTS

| | | | |
|---|---|---|---|
| 4,039,897 | 8/1977 | Dragoset | 315/205 |
| 4,766,350 | 8/1988 | Hüsgen et al. | 315/207 |
| 4,904,907 | 2/1990 | Allison et al. | 315/307 |
| 4,952,849 | 8/1990 | Fellows et al. | 315/307 |
| 5,103,143 | 4/1992 | Daub | 315/308 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/82 |
| 5,212,428 | 5/1993 | Sasaki et al. | 315/82 |

Primary Examiner—Robert J. Pascal
Assistant Examiner—Michael B. Shingleton
Attorney, Agent, or Firm—Sughrue, Mion, Zinn, Macpeak & Seas

[57] ABSTRACT

Disclosed is a lighting circuit for a vehicular discharge lamp which controls current limitation in accordance with the status of the discharge lamp to thereby suppress an increase in consumption current when a source voltage drops. In the lighting circuit, when a lighting switch 5 is set on, a battery voltage is boosted in a DC booster circuit and is converted into an AC voltage by a DC/AC converter before it is applied to a metal halide lamp. The DC booster circuit has a chopper structure having an inductor and a field effect transistor (FET). A control signal from a control circuit is sent to the FET. The control circuit has a V (voltage)-I (current) controller for controlling the lighting and a PWM (Pulse Width Modulation) controller. The lighting circuit further has a current compensator to prevent an excessive current from flowing through the FET at the beginning of the lighting or when the battery voltage drops. This current compensator monitors the status of the lamp, produces a signal of a sawtooth wave corresponding to this status, and superimposes this signal on a current detection signal, thereby restricting the peak value of the current flowing through the FET and the average current with the help of the slope compensating function of the PWM controller. Thus, current limitation is controlled so that when the lamp current is large, the degree of current limitation is increased.

22 Claims, 8 Drawing Sheets

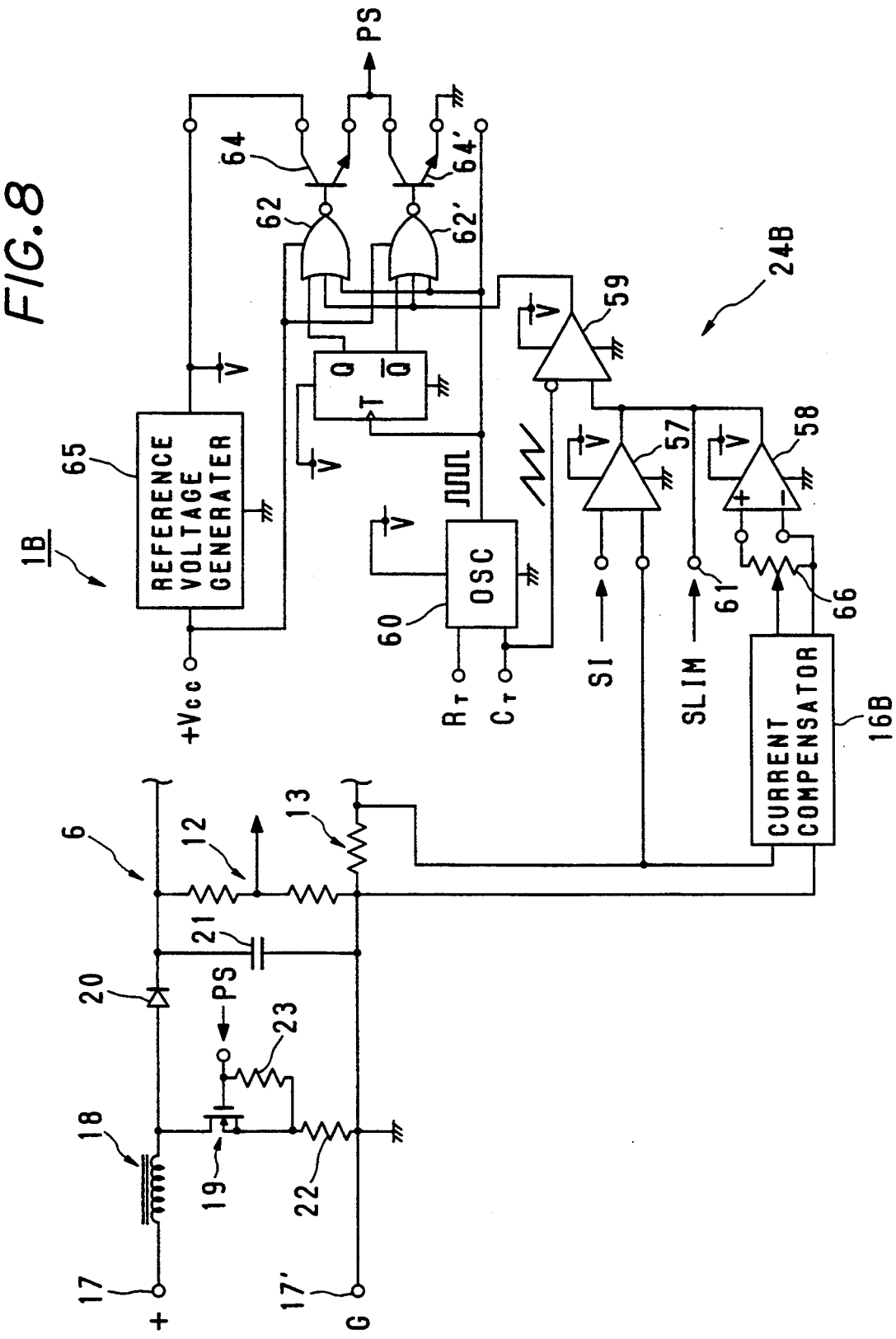

LIGHTING CIRCUIT FOR VEHICULAR DISCHARGE LAMP

BACKGROUND OF THE INVENTION

1. Field of the Invention

The present invention generally relates to a novel lighting circuit for a vehicular discharge lamp. More particularly, this invention pertains to a novel lighting circuit with a DC booster circuit for a vehicular discharge lamp, which lighting circuit detects the status of a discharge lamp to variably control the degree of limiting the current flowing in a semiconductor switch element in the DC booster circuit, thereby suppressing an increase in consumption current at the beginning of the lighting of the discharge lamp or when the source voltage drops.

2. Description of the Related Art

Compact metal halide lamps have recently been receiving greater attention as a light source that can replace an incandescent lamp. A known lighting circuit for a vehicular metal halide lamp uses a DC power source, boosts the DC input voltage by a booster circuit and then converts the boosted voltage into an AC voltage of a sine waveform or rectangular waveform by a DC/AC converter before applying the voltage to the metal halide lamp.

The lighting circuit is also equipped with a control circuit, which performs control matching of the status of the lamp to cause the flux of lamp light from promptly becoming a steady rated level, and performs stable power control in the steady state. The output signal of the control circuit is sent to the DC booster circuit to control the boosting degree.

For instance, the control circuit is designed to detect the lamp voltage or lamp current, or its equivalent signal, cause a current several times greater than that in the steady state to flow in the lamp at the beginning of the lighting when the lighting of the lamp starts from a cold state, thereby shortening the time for the lampflux to reach the steady level, perform control in accordance with the restart voltage when the lamp has been turned off and is activated again shortly thereafter, or produce a control signal to ensure stable power control in the steady state and send the control signal to a semiconductor switch element in the DC booster circuit to carry out PWM (Pulse Width Modulation) control.

This type of lighting circuit however needs some kind of current limiting means to prevent an excessive current from flowing through the semiconductor switch element in the DC booster circuit, when the DC booster circuit is affected by a variation in battery voltage as the input voltage or a variation in load to greatly change the consumption current.

To protect the semiconductor switch element in the DC booster circuit, a limiter circuit may be provided to prevent the current from exceeding a predetermined value. With the limiter level fixed, this method undesirably permits an excessive consumption current to flow through the DC booster circuit when the battery voltage falls.

It is therefore necessary to select a greater capacity for the fuse of the power source than necessary, or use a semiconductor switch element having a high current rated value.

This is because the current limit of the limiter, which is set when the battery voltage falls within a certain specified range cannot cope with a drop of the battery voltage (in which case a greater current limit is required).

FIGS. 9A–9B presents graphs schematically illustrating time-dependent changes of the lamp flux L and the consumption current Ic ("t" representing the time). FIG. 9A shows the case where the battery voltage is in the specified range, and FIG. 9B the case where the battery voltage is low.

With the battery voltage falling in the specified range, when the consumption current Ic starts increasing from the beginning of the lighting and reaches a certain level, the lamp flux L approaches the steady value after which the Ic decreases, as shown in FIG. 9A.

In the case of FIG. 9B, however, while the battery voltage drops sharply, the power supplied to the lamp does not change much. It is apparent from this graph that the consumption current Ic greatly increases from the beginning of the lighting and has a high peak, making a change in current prominent.

The case of FIG. 9B therefore increases the possibility of causing the semiconductor switch element in the DC booster circuit to produce heat or damaging the switch element.

SUMMARY OF THE INVENTION

Accordingly, it is an object of the present invention to provide an improved lighting circuit for a vehicular discharge lamp, which can overcome the above shortcomings.

To achieve the object, according to the present invention, there is provided a lighting circuit for a vehicular discharge lamp, which comprises a DC booster circuit for boosting an input DC voltage; lamp-status detecting means for detecting the status of a discharge lamp; and current limiting means for changing the degree of limitation of a current flowing through a semiconductor switch element in the DC booster circuit, in accordance with a signal from the lamp-status detecting means, whereby the degree of limitation of the current flowing through the semiconductor switch element is varied in accordance with whether the discharge lamp is in a steady status or in a transient status, or in accordance with the current flowing through the discharge lamp.

With this arrangement, it is possible to change the limitation on the current flowing through the semiconductor switch element in the DC booster circuit in accordance with the status of the discharge lamp, and severely limit that current to suppress the consumption current at the beginning of the lighting of the discharge lamp or when the battery voltage falls, thereby protecting the semiconductor switch element.

BRIEF DESCRIPTION OF THE DRAWINGS

FIG. 8 is a circuit diagram showing the essential portions of a lighting circuit according to a third embodiment.

DETAILED DESCRIPTION OF THE PREFERRED EMBODIMENTS

Preferred embodiments of a lighting circuit for a vehicular discharge lamp according to the present invention will be described below with reference to the accompanying drawings.

First Embodiment

FIGS. 1 through 5 illustrate a first embodiment of the present invention.

Figure 1:
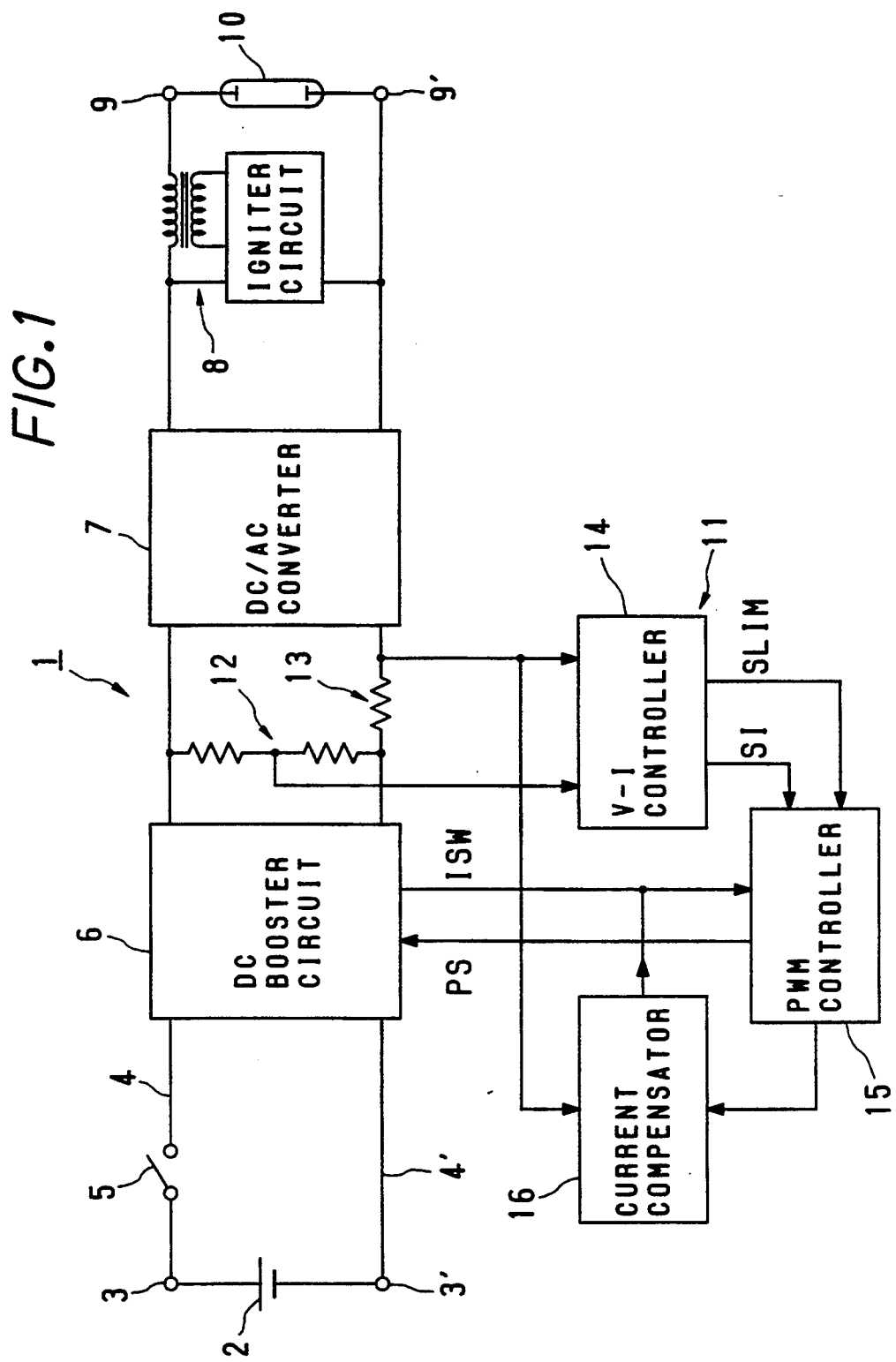
FIG. 1 is a block diagram illustrating the constitution of a lighting circuit according to a first embodiment of the present invention.

FIG. 1 schematically shows the constitution of a lighting circuit 1. The lighting circuit 1 has a battery 2, connected between DC voltage input terminals 3 and 3', a lighting switch 5, a DC booster circuit 6, a DC/AC converter 7, an igniter circuit 8, a control circuit 11, a voltage detector 12, provided between the output terminals of the DC booster circuit 6, and a current detector 13 provided on the line connecting the DC booster circuit 6 and DC/AC converter 7. Reference numerals 4 and 4' denote DC power supply lines. The lighting switch 5 is inserted in the positive line 4.

The DC booster circuit 6 is provided to boost a battery voltage under the control of the control circuit 11 which will be described in detail later.

The DC/AC converter 7 is provided at the subsequent stage of the DC booster circuit 6 to convert the DC voltage from the booster circuit 6 into an AC voltage of a rectangular waveform. A bridge type driving circuit is used for this DC/AC converter 7.

The igniter circuit 8 is provided at the subsequent stage of the DC/AC converter 7. A metal halide lamp 10 having rated power of 35 W is connected between AC output lines 9 and 9' of the igniter circuit 8.

The control circuit 11 serves to control the output voltage of the DC booster circuit 6. The control circuit 11 receives a voltage detection signal from the voltage detector 12, which detects the output voltage of the DC booster circuit 6. The control circuit 11 also receives a current detection signal from the current detector 13, which corresponds to the output current of the DC booster circuit 6. Before entering the control circuit 11, this current detection signal has been converted into a voltage by the current detector 13.

The control circuit 11 generates a control signal according to these detection signals, and sends the control signal to the DC booster circuit 6 to control the output voltage of the circuit 6, thereby performing power control matching the status of the metal halide lamp 10 at the time of activation. Accordingly, the control circuit 11 can shorten the time of activating the lamp or the time of reactivating the lamp, and can perform stable lighting control in the steady mode.

The control circuit 11 includes a V (voltage) - I (current) controller 14, a PWM controller 15, and a current compensator 16.

The V-I controller 14 is designed to perform lighting control of the metal halide lamp 10 based on a control curve which defines the relationship between the lamp voltage and lamp current. When receiving the detection signal from the voltage detector 12, which is associated with the output voltage of the DC booster circuit 6, the V-I controller 14 acquires a current instructing value corresponding to the detection signal through an operation, and sends an instruction signal, denoted by SI, to the PWM controller 15.

The V-I controller 14 sends out a signal (SLIM) to suppress the lamp current at the beginning of the lighting from becoming unnecessarily larger to the PWM controller 15.

The PWM controller 15 produces a signal whose pulse width varies in accordance with the instruction signal from the V-I controller 14, and sends out this signal as a control signal (PS) for a semiconductor switch element in the DC booster circuit 6.

The PWM controller 15 has a slope compensating function and receives a current detection signal (ISW) concerning the current flowing through the semiconductor switch element in the DC booster circuit 6.

The current compensator 16 detects the status of the lamp and superimposes a sawtooth wave corresponding to the detected status on the current detection signal ISW to change the degree of current limitation, thereby controlling the peak current and average current flowing through the semiconductor switch element in the DC booster circuit 6.

More specifically, the current compensator 16 detects whether the lamp current is relatively small as in the steady state or the lamp current is large as in the transient state from the beginning of the lighting to the steady state, and performs current control in such a way that the degree of current limitation is made greater for the latter case than for the former case.

Figure 2:
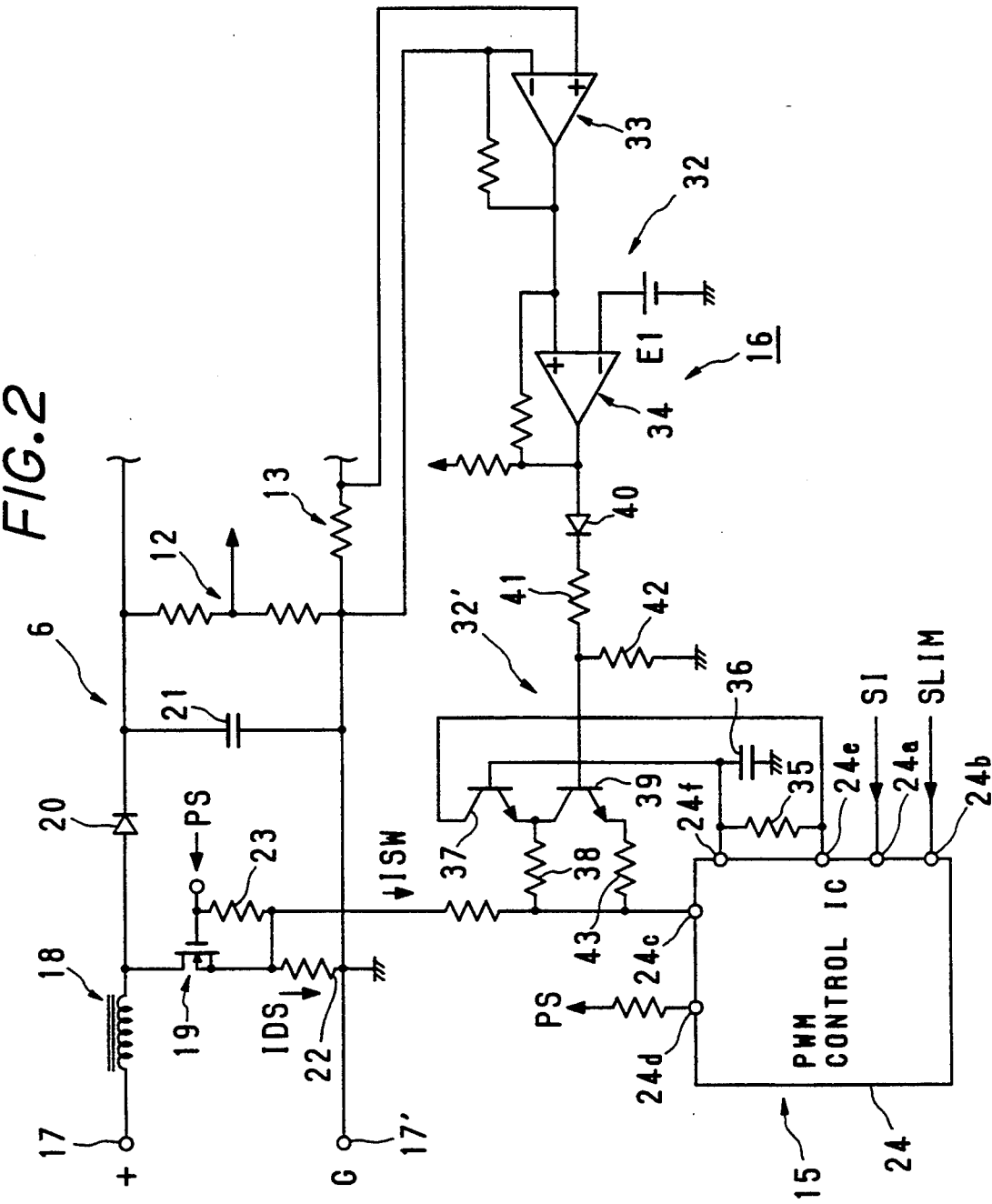
FIG. 2 is a circuit diagram showing the essential portions of this lighting circuit.

FIG. 2 illustrates the essential portions of the lighting circuit 1.

The DC booster circuit 6 receives the battery voltage at its DC input terminals 17 and 17', and comprises an inductor 18 provided on the positive terminal 17, an FET 19 for switching the inductor 18, a diode 20 and a capacitor 21. The last two elements 20 and 21 are provided at the output stage.

More specifically, the N channel FET 19 has a drain connected to the rear end of the inductor 18, a source grounded via a resistor 22, and a gate which is supplied with the control signal PS from the PWM controller 15.

A resistor 23 is inserted between the gate and source of the FET 19.

The diode 20 has its anode connected to the inductor 18 and its cathode connected to the output terminal as well as to one end of the capacitor 21.

A PWM control IC 24 having a slope compensating function is used in the PWM controller 15. The PWM control IC 24 has an input terminal 24a and a compensation terminal 24b, which are respectively supplied with the signals SI and SLIM from the V-I controller 14. The PWM control IC 24 further has a current detection terminal 24c and an output terminal 24d. Input to the current detection terminal 24c is the detection signal ISW concerning the drain current of the FET 19 of the DC booster circuit 6. A control output is sent via a resistor to the gate of the FET 19 of the DC booster circuit 6 from the output terminal 24d.

Figure 3:
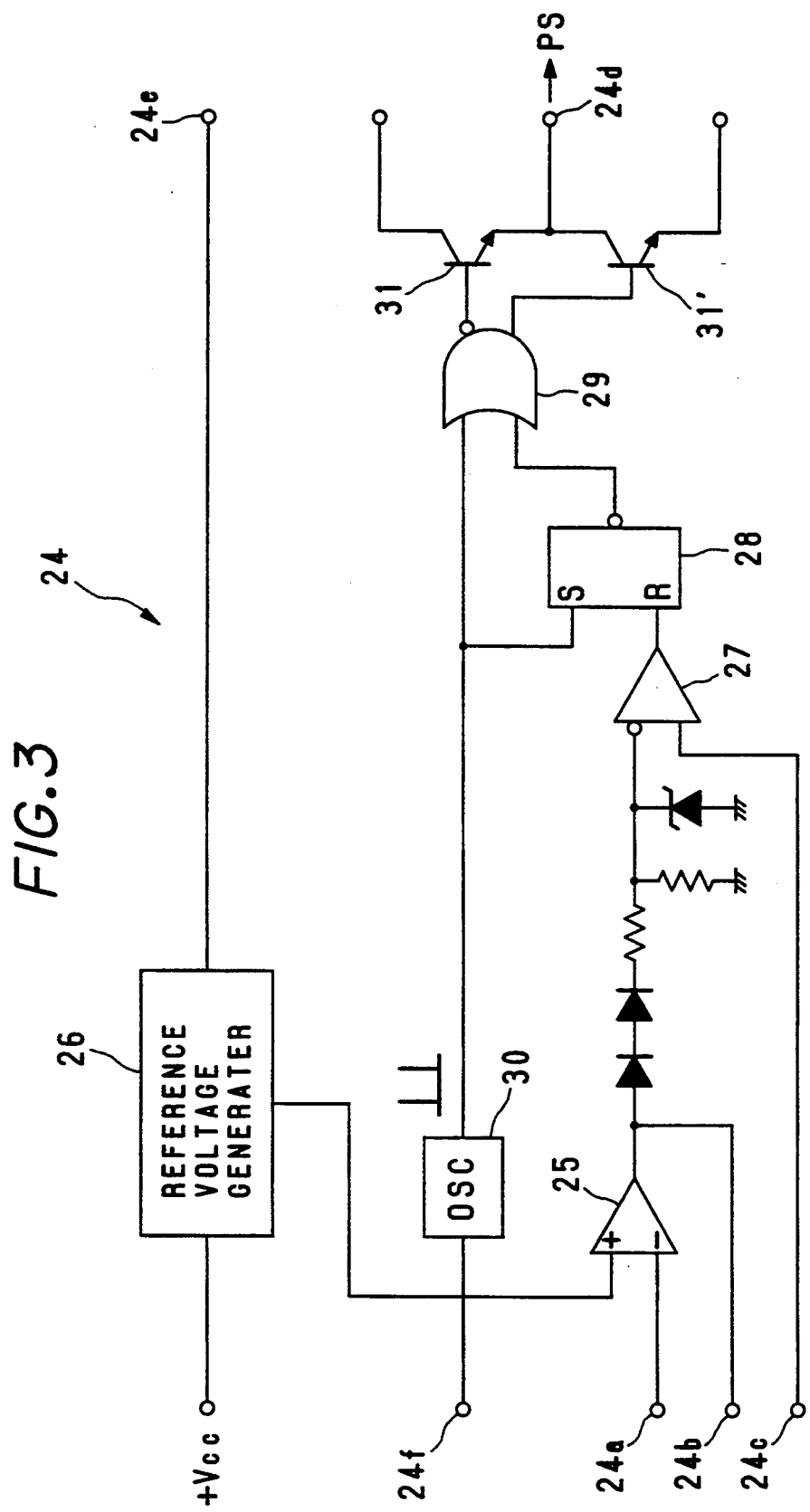
FIG. 3 is a block diagram illustrating the constitution of a PWM control IC shown in FIG. 2.

FIG. 3 illustrates the internal structure of the PWM control IC 24. The PWM control IC 24 includes an error amplifier 25, which has an inverting input terminal connected to the input terminal 24a and a non-inverting input terminal supplied with a predetermined voltage from a reference voltage generator 26.

The reference voltage generator 26 produces a voltage necessary for external circuits as well as a source voltage necessary in the PWM control IC 24, and those voltages are available from a reference voltage terminal 24e.

The output terminal of the error amplifier 25 is connected to the compensation terminal 24b directly and to a negative-edge input terminal of a current detecting comparator 27 via diodes, resistors and a Zener diode. This comparator 27 has the other input terminal connected to the current detection terminal 24c, and sends its output to an OR gate 29 via a latching RS flip-flop 28.

The RS flip-flop 28 has an R terminal supplied with the output of the current detecting comparator 27 and an S terminal supplied with the output signal of an oscillator 30. The output of the oscillator 30 is sent to an OR gate 29 and can be picked up by the external circuit from the terminal 24f. The output of this OR gate 29 is picked up from the output terminal 24d via complimentarily-connected transistors 31 and 31'.

The signal PS finally produced by the PWM control IC 24 has a duty cycle which varies in synchronism with the timing of the output signal of the oscillator 30 based on the voltage level of the signal SI or SLIM and the current detection signal. As the output signal of the current compensator 16, which has been acquired by using the output of the oscillator 30, is input together with the current detection signal to the current detection terminal 24c, the slope compensation is effected.

The current compensator 16 includes circuits 32 and 32'. The circuit 32 detects a signal corresponding to the lamp current and compares the level of that signal with a predetermined value to discriminate the lamp status. The circuit 32' superimposes a sawtooth wave according to the discrimination result on the current detection signal ISW and sends the resultant signal to the current input terminal 24c of the PWM control IC 24.

In the circuit 32, the detection signal from the current detector 13 is input via an amplifier 33 to a comparator 34 and its level is compared with a predetermined value (indicated by a voltage source E1 in FIG. 3).

Figure 4:
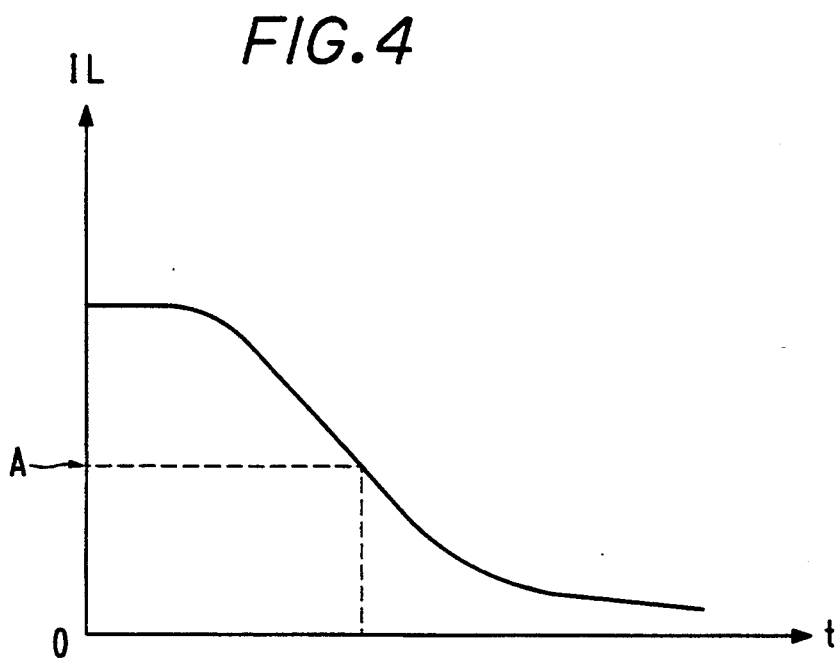
FIG. 4 is a graph showing a time-dependent change of the lamp current of a discharge lamp.

FIG. 4 shows a time-dependent change in lamp current IL of the metal halide lamp 10 with the beginning of the lighting as the origin. It is apparent from the graph that the current value is the highest immediately after the lighting switch 5 is set on and gradually decreases as the time elapses.

By detecting if the lamp current is equal to or greater than a certain level (indicated by an arrow A in FIG. 4), it is possible to detect whether the present lamp status corresponds to the transient period from the beginning of the lighting to the steady status of the lamp, or is in or close to the steady status.

According to this embodiment, as the current detection signal shows a change similar to that of the lamp current, this change is used as a reference for the lamp status. The level of the current detection signal is therefore compared with the reference current value corresponding to the level indicated by the arrow A in FIG. 4 to binarize the lamp status.

To describe in detail, with the level of the current detection signal being equal to or greater than the reference current value, it is considered that the lamp is still in the transient status, and the comparator 34 outputs a high-level (H) signal. With the level of the current detection signal being less than the reference current value, it is considered that the lamp is in or close to the steady status, and the comparator 34 outputs a low-level (L) signal.

The circuit 32' includes a portion which utilizes the output of the oscillator 30 of the PWM control IC 24 to produce a sawtooth wave, and a portion which changes the slope of the sawtooth wave in accordance with the output signal of the comparator 34 and superimposes the resultant wave on the current detection signal ISW. Those circuit portions will be described below more specifically.

A resistor 35 is inserted between the output terminal 24f of the oscillator 30 of the PWM control IC 24 and the reference voltage terminal 24e, and a capacitor 36 is connected in series to the resistor 35. The output terminal 24f of the oscillator 30 is also connected to the node between the resistor 35 and capacitor 36, which constitute a low-pass filter.

An NPN transistor 37 has its collector connected to the reference voltage terminal 24e and its base connected between the capacitor 36 and resistor 35. The emitter of the NPN transistor 37 is connected via a resistor 38 to the current detection terminal 24c of the PWM control IC 24.

An NPN transistor 39, provided on the emitter side of the transistor 37, has its base supplied with the output of the comparator 34 via a diode 40 and resistors 41 and 42. The emitter of the transistor 39 is connected via a resistor 43 to the current detection terminal 24c of the PWM control IC 24.

Figure 5:
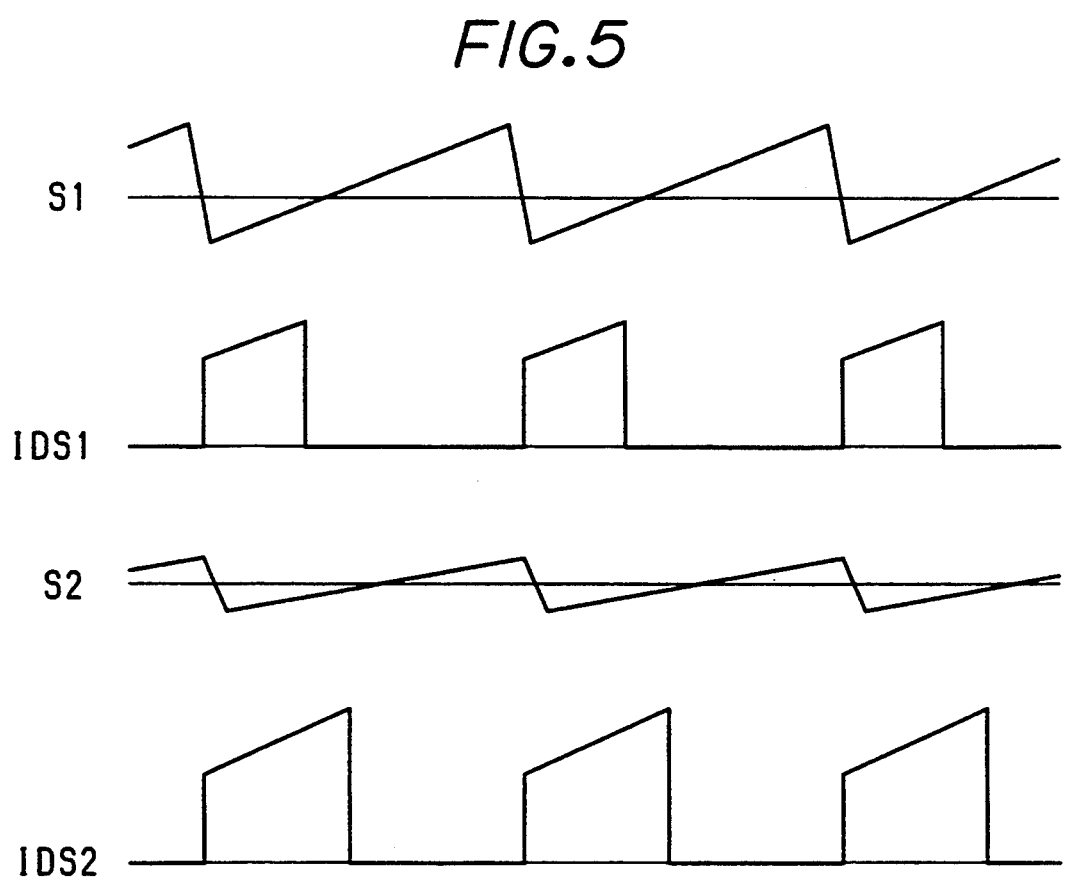
FIG. 5 shows waveforms for explaining the operation of the lighting circuit.

FIG. 5 shows sawtooth waves that is to be superimposed on the current detection signal ISW by the current compensator 16, and the waveforms of a current IDS flowing through the FET 19.

An upper waveform S1 indicates a sawtooth wave for a large current limitation, and a waveform IDS1 indicates the waveform of the current IDS in this case.

A lower waveform S2 indicates a sawtooth wave for a small current limitation, and a waveform IDS2 indicates the waveform of the current IDS in this case.

While the lamp is in the transient status, the output of the comparator 34 has an H level as described above, so that the transistor 39 is turned on, causing the sawtooth wave produced based on the output of the oscillator 30 to be superimposed on the signal ISW via the resistors 38 and 43.

In other words, as the sawtooth wave in this case has a steep inclination (wide ripple width) as indicated by the waveform S1, it is superimposed on the signal ISW and the resultant signal is sent to the current detecting comparator 27 of the PWM control IC 24. As a result, the duty cycle of the control signal is restricted so that the peak value and the ON duration of the current flowing through the FET 19 are limited as indicated by the waveform IDS1.

When the lamp is in or close to the steady status, the output of the comparator 34 becomes an L level as described above, so that the transistor 39 is turned off, causing the sawtooth wave produced based on the output of the oscillator 30 to be superimposed on the signal ISW via the resistor 38 alone.

The sawtooth wave in this case has a gentler inclination (narrow ripple width) than the waveform S1, as indicated by the waveform S2, so that this wave is superimposed on the signal ISW and the resultant signal is sent to the current detecting comparator 27 of the PWM control IC 24. As a result, the restriction on the duty cycle of the control signal is relaxed, reducing the degree of current limitation on the current flowing through the FET 19 as indicated by the waveform IDS2.

In short, current limitation is performed on the FET 19 in such a way that the sawtooth wave S1 with a steep slope is superimposed on the signal ISW immediately after the lighting starts, thus increasing the degree of current limitation, and that the sawtooth wave S2 with a gentle slope is superimposed on the signal ISW when the lamp approaches the steady status thereafter, thus reducing the degree of current limitation.

Figure 9A:
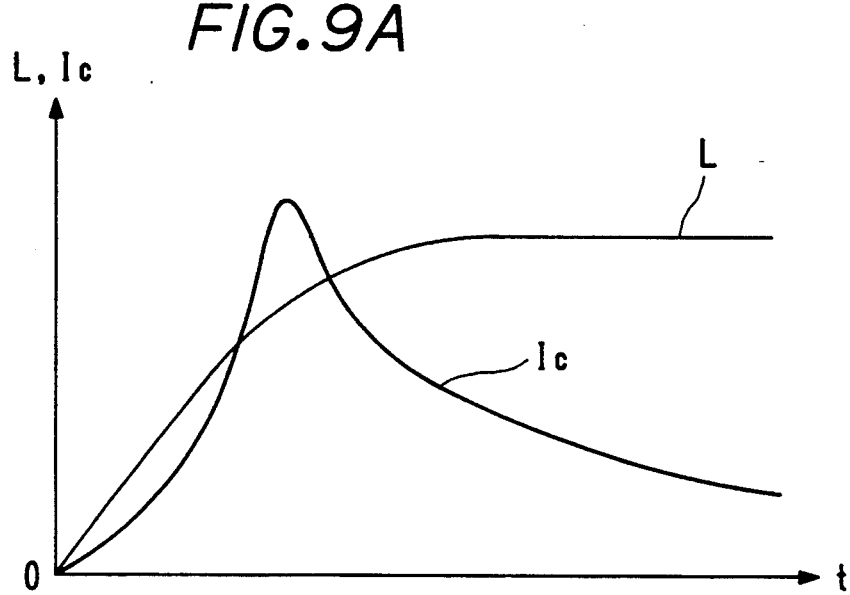
FIGS. 9A–9B presents graphs for explaining the conventional problems, FIG. 9A showing the case where the battery voltage is within a specified range while FIG. 9B showing a graph of the prior art in comparison with a graph of the present invention when the battery voltage falls.
Figure 9B:
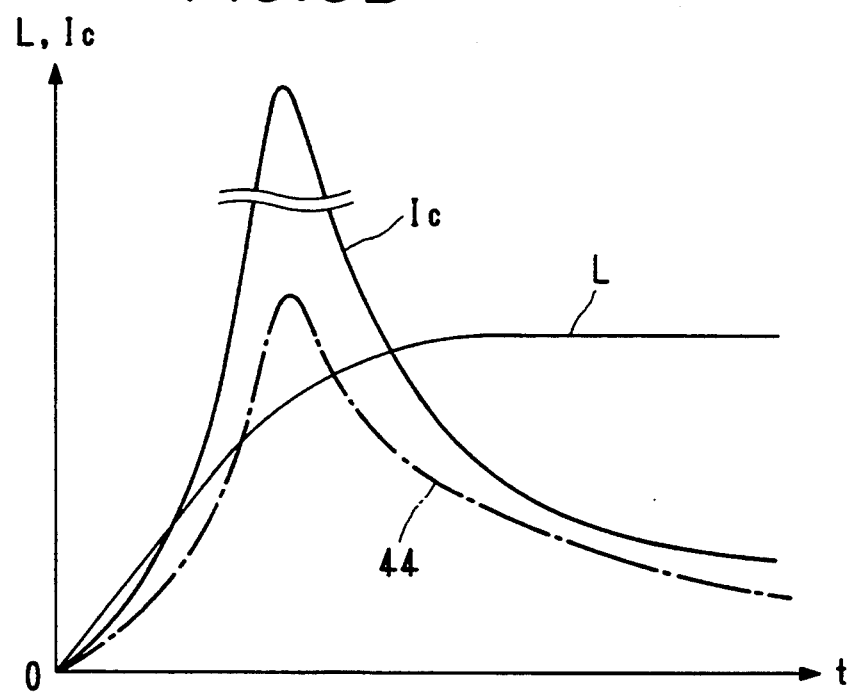

When the battery voltage drops, the level of the current detection signal rises. When this level becomes the reference value or higher, control is performed to increase the degree of current limitation as in the case of the transient status. Accordingly, an increase in consumption current Ic is suppressed as indicated by an alternate long and short dash line 44 in FIG. 9B.

Second Enbodiment

A lighting circuit 1A for a vehicular discharge lamp according to a second embodiment of the present invention will now be described referring to FIGS. 6 and 7.

The lighting circuit 1A of the second embodiment differs from that of the first embodiment in that the lamp status is separated into two to switch the degree of current limitation in each case in the first embodiment, whereas the degree of current limitation is continuously changed in accordance with the status of the lamp in the second embodiment.

Like or same reference numerals as used for the first embodiment will be used to denote corresponding or identical components in the second embodiment to avoid their redundant descriptions. The same shall be applied to a third embodiment which will be described shortly after.

Figure 7:
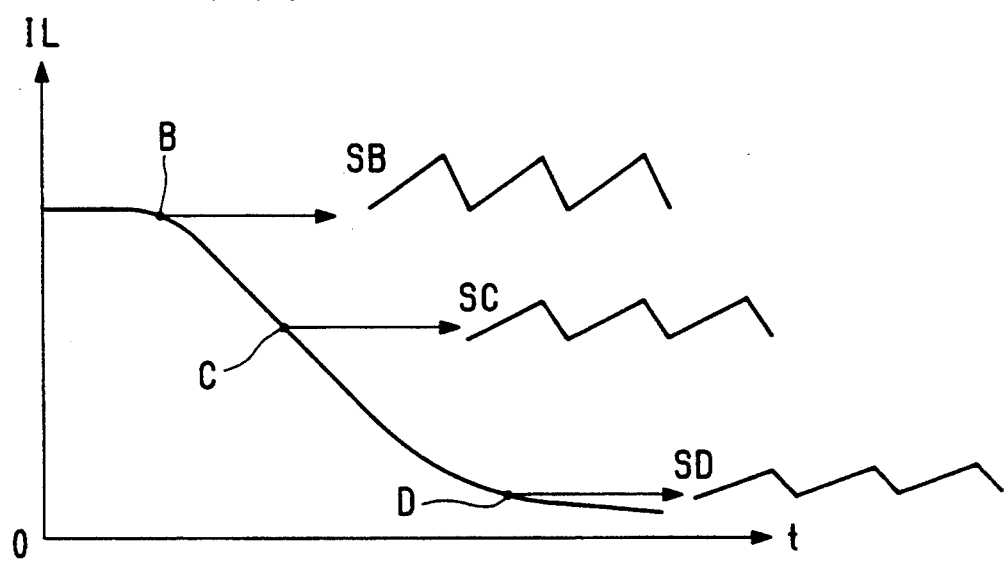
FIG. 7 presents a graph for explaining the operation of the second embodiment.

FIG. 7 gives a conceptual illustration of the current limitation in the second embodiment, illustrating the relation between a time-dependent change in lamp current IL starting from the beginning of the lighting and the waveform of a sawtooth produced by the current compensator.

While the PWM control IC 24 having a slope compensating function is also used in the PWM controller in the second embodiment, the degree of the slope of the sawtooth produced by the current compensator according to the lamp status changes continuously.

With a large lamp current as indicated by a point B in FIG. 7, the slope of the sawtooth wave is steep as indicated by a waveform SB. With a smaller lamp current as indicated by a point C, the slope of the sawtooth wave becomes a little gentler as indicated by a waveform SC. When the lamp current becomes small as indicated by a point D, the slope of the sawtooth wave becomes further gentler as indicated by a waveform SD.

Figure 6:
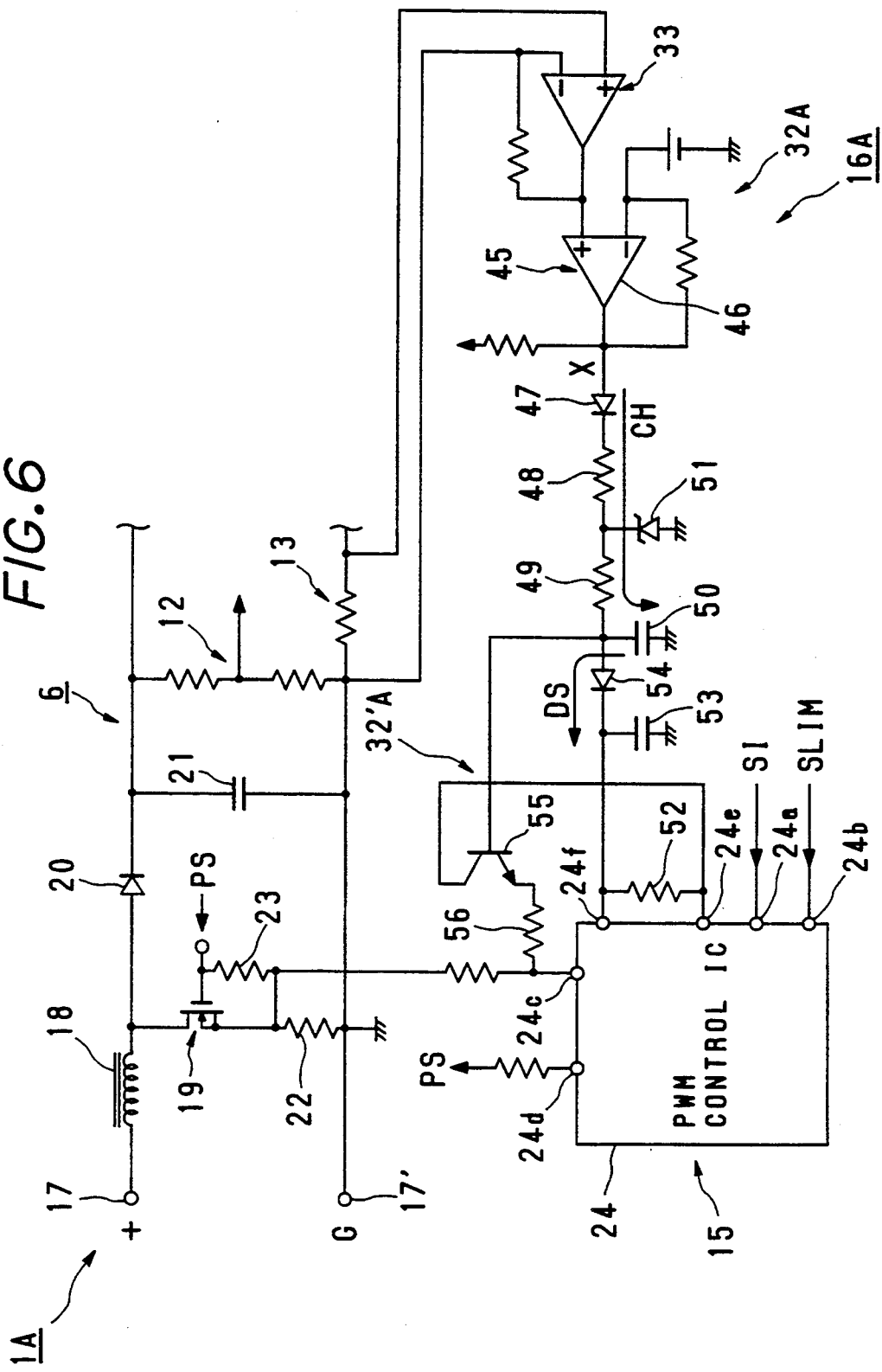
FIG. 6 is a circuit diagram showing the essential portions of a lighting circuit according to a second embodiment.

FIG. 6 illustrates the constitution of the circuit around a current compensator 16A, which comprises a circuit portion 32A for detecting the status of the lamp and a circuit portion 32'A that is associated with superimposition of the sawtooth wave.

The current detection signal from the current detector 13 is input as a signal equivalent to the lamp current to a differential amplifier 45 via the amplifier 33.

The differential amplifier 45 is constituted of a negative feedback circuit using an operational amplifier 46. The output terminal of this amplifier 45 is connected via a diode 47 and resistors 48 and 49 to one end of a capacitor 50.

A Zenner diode 51 has its cathode connected between the resistors 48 and 49 and its anode grounded.

A resistor 52 is inserted between the output terminal 24f of the oscillator 30 of the PWM control IC 24 and the reference voltage terminal 24e, with a capacitor 53 connected in series to the resistor 52. The output terminal 24f of the oscillator 30 is connected between the resistor 52 and capacitor 53.

A diode 54 is provided between the capacitors 50 and 53, and has its cathode connected to one end of the capacitor 50 and its anode connected to one end of the capacitor 53.

An NPN transistor 55 has its collector connected to the reference voltage terminal 24e of the PWM control IC 24, and its emitter connected to the current detecting terminal 24c of the PWM control IC 24 via a resistor 56. The terminal voltage of the capacitor 50 is applied to the base of the transistor 55.

In the thus constituted current compensator 16A, the potential (point X in FIG. 6) at the output terminal of the differential amplifier 45 varies in accordance with the level of the current detection signal.

Charging (indicated by an arrow CH in FIG. 6) to the capacitor 50 via the diode 47 and resistors 48 and 49 from the point X and discharging (indicated by an arrow DS in FIG. 6) from the capacitor 50 to the terminal 24f via the diode 54 are repeated in synchronism with the sawtooth wave which is acquired based on the output of the oscillator 30 of the PWM control IC 24. Accordingly, the sawtooth wave whose amplitude is defined by the potential at the point X is produced and is superimposed on the current detection signal ISW via the transistor 55.

As the level of the current detection signal associated with the lamp current becomes large, therefore, the produced sawtooth wave has a steeper slope, increasing the degree of current limitation. As the level of the current detection signal associated with the lamp current becomes small, on the other hand, the slope of the produced sawtooth wave becomes gentler, reducing the degree of current limitation. It is apparent that the control described with reference to FIG. 7 is accomplished.

As the second embodiment ensures smooth current limitation according to the lamp status, there will not be a large change in the degree of current limitation when the lamp status changes. This reduces the influence on a change in lamp flux and will not disturb the stable lighting control (e.g., oscillation due to a change in current limitation).

The circuit constitution of the current compensator 16A is not limited to the one shown in FIG. 6, but may be designed to use an operational amplifier with a high through rate to vary the amplification factor in accordance with the level of the current detection signal associated with the lamp current, whereby the resultant sawtooth wave is superimposed on the signal ISW. In other words, control is performed in such a way that as the level of the current detection signal associated with the lamp current becomes large, the amplification factor for the sawtooth wave should be increased.

FIG. 8 illustrates the essential portions of a lighting circuit 1B according to a third embodiment of the present invention.

While the limitation on the peak current average current of the FET 19 of the DC booster circuit 6 is performed in accordance with the lamp status in the above-described first and second embodiments, only the peak current of the FET 19 is restricted in accordance with the lamp status in the third embodiment.

A PWM control IC 24B used in the PWM controller 15 is designed in such a way that a wired-OR output of an error amplifier 57 and a current limiting amplifier 58 is sent to one input terminal of a PWM comparator 59 and the sawtooth wave from an oscillator 60 is input to the other input terminal of the comparator 59.

A compensation terminal 61 for compensating the characteristic of the error amplifier 57 is connected to the output terminal of the error amplifier 57.

Reference numerals "62" and "62'" denote 3-input NOR gates which each receive the output of the PWM comparator 59, and the rectangular-wave signal from the oscillator 60 directly and via a T flip-flop 63.

The outputs of the 3-input NOR gates 62 and 62' are extracted by external circuits via transistors 64 and 65, respectively. A reference voltage generator 65 for producing voltages necessary for the individual sections is provided in the IC 24, so that specified voltages produced by this generator 65 can be supplied to external circuits.

The control signal SI from the V-I controller 14 and the current detection signal from the current detector 13 are input to the error amplifier 57, while the control signal SLIM from the V-I controller 14 is input to the compensation terminal 61.

A variable resistor 66 is provided between the input terminals of the current limiting amplifier 58, and its terminal voltage is controlled by the signal from the current compensator 16B.

This current compensator 16B serves to control the terminal voltage of the variable resistor 66 in accordance with the level of the current detection signal, thereby controlling the degree of the limitation of the current flowing through the FET 19.

More specifically, when the level of the current detection signal is equal to or greater than a predetermined value, the level of the output signal is increased to activate the current limiting circuit constituted by the current limiting amplifier 58, and when the level of the current detection signal is less than the predetermined value, the level of the output signal is lowered so that the current limiting circuit will not be activated.

For instance, the level of the current detection signal should be compared with a predetermined value by the comparator 59 and the comparison output should be sent to the current limiting amplifier 58 after being voltage-divided by the variable resistor 66.

With the above constitution, when the value of the current that flows through the lamp is likely to increase at the beginning of the lighting of the lamp or at the time the battery voltage drops, the peak current is restricted to protect the FET 19.

The networks of resistors may be built in accordance with the lamp statuses in the current compensator 16B to separate the detection of the lamp status into a plurality of stages, or continuous current limitation according to the lamp status as in the second embodiment may also be employed.

According to the present invention, as described above, the limitation on the current flowing through the semiconductor switch element in the DC booster circuit is changed in accordance with the status of the discharge lamp, and severe current limitation is executed when an excessive current is likely to flow as in the case where the lighting of the discharge lamp starts or where the battery voltage falls. It is therefore possible to protect the semiconductor switch element against such an over current, thereby improving the reliability and stability of the lighting control.

The present invention is not limited to a system of lighting a discharge lamp with a signal of a rectangular wave, but may be applied to other various types of lighting circuits which employ another lighting system, such as a sine-wave lighting system.

What is claimed is:

1. A lighting circuit for a vehicular discharge lamp, comprising:
    a DC booster circuit for boosting an input DC voltage;
    lamp-status detecting means for detecting a status of said vehicular discharge lamp and for superimposing a current control signal onto a current detection signal corresponding to a current flowing through a semiconductor switch element in said DC booster circuit; and
    current limiting means for controlling an amount of current flowing through said semiconductor switch element in accordance with said current detecting signal superimposed with said control signal output by said lamp-status detecting means, wherein said amount of said current flowing through said semiconductor switch element is varied in accordance with whether said vehicular discharge lamp is in one of a steady status and a transient status.

2. A lighting circuit for a vehicular discharge lamp, comprising:
    a DC booster circuit for boosting an input DC voltage;
    lamp-status detecting means for detecting a status of said vehicular discharge lamp by detecting a lamp current of said vehicular discharge lamp and for superimposing a current control signal onto a current detection signal corresponding to a current flowing through a semiconductor switch element in said DC booster circuit; and
    current limiting means for controlling at least one of a peak current and an average current flowing through said semiconductor switch element in accordance with said current detection signal superimposed with said current control signal output by said lamp-status detecting means, wherein when said current flowing through said vehicular discharge lamp is above a predetermined value, said peak current and said average current flowing through said semiconductor switch element is increased.

3. A lighting circuit for a vehicular discharge lamp, comprising:
    a DC booster circuit for boosting an input DC voltage;
    lamp-status detecting means for detecting a status of said vehicular discharge lamp; and current limiting means for controlling an amount of a current flowing through a semiconductor switch element in said DC booster circuit in accordance with a signal from said lamp-status detecting means, wherein said amount of said current flowing through said semiconductor switch element is varied in accordance with whether said vehicular discharge lamp is in one of a steady status and a transient status;

wherein said lighting circuit further comprises a control circuit for sending a control signal to said semiconductor switch element in said DC booster circuit to perform boosting control, said control circuit comprising a pulse width modulation section having a slope compensating function, and wherein said current limiting means superimposes a compensation signal corresponding to said status of said vehicular discharge lamp on a current detection signal of said current flowing through said semiconductor switch element and sends a resultant signal to said pulse width modulation section, wherein said pulse width modulation section controls said amount of said current flowing through said semiconductor switch element.

4. The lighting circuit according to claim 1, further comprising a pulse width modulation controller having a slope compensating function, for receiving said current detection signal superimposed with said current control signal.

5. The lighting circuit according to claim 4, further comprising a DC/AC converter for converting an output DC voltage from said DC booster circuit into an AC voltage of a rectangular waveform, an igniter circuit, said vehicular discharge lamp and a voltage-current controller for performing lighting control of said vehicular discharge lamp based on a control curve which defines the relationship between a lamp voltage and a lamp current.

6. The lighting circuit according to claim 2, further comprising a pulse width modulation controller having a slope compensating function, for receiving said current detection signal superimposed with said current control signal.

7. The lighting circuit according to claim 6, further comprising a DC/AC converter for converting an output DC voltage from said DC booster circuit into an AC voltage of a rectangular waveform, an igniter circuit, said vehicular discharge lamp and a voltage-current controller for performing lighting control of said vehicular discharge lamp based on a control curve which defines the relationship between a lamp voltage and a lamp current.

8. The lighting circuit according to claim 1, wherein said DC booster circuit includes an inductor, a field effect transistor, a diode and a capacitor.

9. The lighting circuit according to claim 1, wherein said lamp-status detecting means includes a current detector for outputting a detection signal corresponding to an output current of said DC booster circuit and a circuit portion for discriminating said status of said vehicular discharge lamp from said detection signal of said current detector.

10. A lighting circuit for a vehicular discharge lamp, comprising:
a DC booster circuit for boosting an input DC voltage;
lamp-status detecting means for detecting a status of said vehicular discharge lamp; and
current limiting means for controlling an amount of a current flowing through a semiconductor switch element in said DC booster circuit in accordance with a signal from said lamp-status detecting means, wherein said amount of said current flowing through said semiconductor switch element is varied in accordance with whether said vehicular discharge lamp is in one of a steady status and a transient status;
wherein said current limiting means includes a first circuit portion for detecting a current signal corresponding to a lamp current and discriminating said status of said vehicular discharge lamp, and a second circuit portion for producing a sawtooth wave, changing a slope of said sawtooth wave and superimposing a slope-changed sawtooth wave on said current signal.

11. The lighting circuit according to claim 2, wherein said DC booster circuit includes an inductor, a field effect transistor, a diode and a capacitor.

12. The lighting circuit according to claim 2, wherein said lamp-status detecting means includes a current detector for outputting a detection signal corresponding to an output current of said DC booster circuit and a circuit portion for discriminating said status of said vehicular discharge lamp from said detection signal of said current detector.

13. Lighting circuit for a vehicular discharge lamp, comprising:
a DC booster circuit for boosting an input DC voltage;
lamp-status detecting means for detecting a status of said vehicular discharge lamp by detecting a lamp current of said vehicular discharge lamp; and
current limiting means for controlling at least one of a peak current and an average current flowing through a semiconductor switch element in said DC booster circuit in accordance with a signal from said lamp-status detecting means, wherein as a current flowing through said vehicular discharge lamp is above a predetermined value, said peak current and average current flowing through said semiconductor switch element is increased;
wherein said current limiting means includes a first circuit portion for detecting a current signal corresponding to a lamp current and discriminating said status of said vehicular discharge lamp, and a second circuit portion for producing a sawtooth wave, changing a slope of said sawtooth wave and superimposing a slope-changed sawtooth wave on said current signal.

14. A lighting circuit for a vehicular discharge lamp, comprising:
a DC booster circuit for boosting an input DC voltage;
lamp-status detecting means for detecting a status of said vehicular discharge lamp and for superimposing a current control signal onto a current detection signal corresponding to a current flowing through a semiconductor switch element in said DC booster circuit; and
current limiting means for continuously changing an amount of a current flowing through said semiconductor switch element in said DC booster circuit in accordance with said current control signal from said lamp-status detecting means, wherein said amount of said current flowing through said semiconductor switch element is continuously varied in accordance with a detected status of said vehicular discharge lamp.

15. The lighting circuit according to claim 14, wherein said DC booster circuit includes an inductor, a field effect transistor, a diode and a capacitor.

16. The lighting circuit according to claim 14, wherein said lamp-status detecting means includes a current detector for outputting a detection signal corresponding to an output current of said DC booster circuit and a circuit portion for discriminating said status of said vehicular discharge lamp from said detection signal of said current detector.

17. A lighting circuit for a vehicular discharge lamp, comprising:
 a DC booster circuit for boosting an input DC voltage;
 lamp-status detecting means for detecting a status of said vehicular discharge lamp; and
 current limiting means for continuously changing an amount of a current flowing through a semiconductor switch element in said DC booster circuit in accordance with a signal from said lamp-status detecting means, wherein said amount of said current flowing through said semiconductor switch element is continuously varied in accordance with a detected status of said vehicular discharge lamp;
 wherein said current limiting means includes a first circuit portion for detecting a current signal corresponding to a lamp current and discriminating said status of said vehicular discharge lamp, and a second circuit portion for producing a sawtooth wave, changing a slope of said sawtooth wave and superimposing a slope-changed sawtooth wave on said current signal.

18. A lighting circuit for a vehicular discharge lamp, comprising:
 a DC booster circuit for boosting an input DC voltage;
 lamp-status detecting means for detecting a status of said vehicular discharge lamp and for superimposing a current control signal onto a current detection signal corresponding to a current flowing through a semiconductor switch element in said DC booster circuit; and
 current limiting means for changing a peak current of said semiconductor switch element in said DC booster circuit in accordance with said current control signal from said lamp-status detecting means, wherein an amount of a current flowing through said semiconductor switch element is varied in accordance with a detected status of said vehicular discharge lamp.

19. The lighting circuit according to claim 18, wherein said DC booster circuit includes an inductor, a field effect transistor, a diode and a capacitor.

20. The lighting circuit according to claim 18, wherein said lamp-status detecting means includes a current detector for outputting a detection signal corresponding to an output current of said DC booster circuit and a circuit portion for discriminating said status of said vehicular discharge lamp from said detection signal of said current detector.

21. A lighting circuit for a vehicular discharge lamp, comprising:
 a DC booster circuit for boosting an input DC voltage;
 lamp-status detecting means for detecting a status of said vehicular discharge lamp; and
 current limiting means for changing a peak current of a semiconductor switch element in said DC booster circuit in accordance with a signal from said lamp-status detecting means, wherein an amount of a current flowing through said semiconductor switch element is varied in accordance with a detected status of said vehicular discharge lamp;
 wherein said current limiting means includes a current detector for detecting a current corresponding to a lamp current and a current limiting circuit for controlling activation and deactivation of a pulse width modulation section in accordance with a level of an output signal from said current detector.

22. A lighting circuit for a vehicular discharge lamp, comprising:
 a DC booster circuit for boosting an input DC voltage;
 lamp-status detecting means for detecting a status of said vehicular discharge lamp by detecting a lamp current of said vehicular discharge lamp; and
 current limiting means for controlling at least one of a peak current and an average current flowing through a semiconductor switch element in said DC booster circuit in accordance with a signal from said lamp-status detecting means, wherein as a current flowing through said vehicular discharge lamp is above a predetermined value, said peak current and said average current flowing through said semiconductor switch element is increased;
 wherein said lighting circuit further comprises a control circuit for sending a control signal to said semiconductor switch element in said DC booster circuit to perform boosting control, said control circuit comprising a pulse width modulation section having a slope compensating function, and wherein said current limiting means superimposes a compensation signal corresponding to said status of said vehicular discharge lamp on a current detection signal of said current flowing through said semiconductor switch element and sends a resultant signal to said pulse width modulation section, wherein said pulse width modulation section controls said peak current and said average current flowing through said semiconductor switch element.

* * * * *